(12) United States Patent
Legallais et al.

(10) Patent No.: US 11,991,338 B2
(45) Date of Patent: May 21, 2024

(54) METHOD CONFIGURED TO BE IMPLEMENTED AT A TERMINAL ADAPTED TO RECEIVE AN IMMERSIVE VIDEO SPATIALLY TILED WITH A SET OF TILES, AND CORRESPONDING TERMINAL

(71) Applicant: INTERDIGITAL CE PATENT HOLDINGS, Paris (FR)

(72) Inventors: Yvon Legallais, Rennes (FR); Charles Salmon-Legagneur, Rennes (FR); Remi Houdaille, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 17/255,010

(22) PCT Filed: Jun. 24, 2019

(86) PCT No.: PCT/EP2019/066577
§ 371 (c)(1),
(2) Date: Dec. 22, 2020

(87) PCT Pub. No.: WO2020/002180
PCT Pub. Date: Jan. 2, 2020

(65) Prior Publication Data
US 2021/0266512 A1    Aug. 26, 2021

(30) Foreign Application Priority Data

Jun. 28, 2018   (EP) ..................................... 18305827

(51) Int. Cl.
*H04N 13/122*   (2018.01)
*G06T 3/00*     (2006.01)
(Continued)

(52) U.S. Cl.
CPC ......... *H04N 13/122* (2018.05); *G06T 3/0093* (2013.01); *H04N 13/111* (2018.05);
(Continued)

(58) Field of Classification Search
CPC .. H04N 13/122; H04N 13/194; H04N 13/111; H04N 21/234345;
(Continued)

(56) References Cited

U.S. PATENT DOCUMENTS

2017/0070835 A1   3/2017  Silva
2017/0154129 A1*  6/2017  Fainberg ................. G06F 30/00
(Continued)

FOREIGN PATENT DOCUMENTS

WO    2017/202899   11/2017
WO    2018/069466    4/2018

OTHER PUBLICATIONS

Heymann et al., "Representation, Coding and Interactive Rendering of High-Resolution Panoramic Images and Video using MPEG-4," Proceedings of Panoramic Photogrammetry Workshop (PPW) (2005).
(Continued)

*Primary Examiner* — Richard T Torrente
(74) *Attorney, Agent, or Firm* — Volpe Koenig (57) ABSTRACT

A terminal adapted to receive an immersive video spatially tiled with a set of tiles is configured to request tiles depending on their intersection with a volume of vision associated with a user.

18 Claims, 5 Drawing Sheets

(51) Int. Cl.
  *H04N 13/111* (2018.01)
  *H04N 13/194* (2018.01)
  *H04N 21/2343* (2011.01)
  *H04N 21/24* (2011.01)
  *G06T 3/4038* (2024.01)

(52) U.S. Cl.
  CPC ... *H04N 13/194* (2018.05); *H04N 21/234345* (2013.01); *H04N 21/23439* (2013.01); *H04N 21/2402* (2013.01); *G06T 3/4038* (2013.01)

(58) Field of Classification Search
  CPC ......... H04N 21/23439; H04N 21/2402; H04N 21/816; H04N 21/8456; H04N 21/6587; H04N 21/4223; H04N 21/44008; H04N 21/440245; H04N 21/4728; H04N 21/236; H04N 21/2365; H04N 21/44218; G06T 3/0093; G06T 3/4038
  See application file for complete search history.

(56) References Cited

U.S. PATENT DOCUMENTS

| | | | |
|---|---|---|---|
| 2018/0096494 A1* | 4/2018 | Zhou | G06T 19/006 |
| 2018/0160160 A1* | 6/2018 | Swaminathan | H04N 21/816 |
| 2019/0238861 A1* | 8/2019 | D'Acunto | H04L 65/65 |
| 2019/0387224 A1* | 12/2019 | Phillips | H04N 19/177 |
| 2020/0177916 A1* | 6/2020 | Niamut | H04N 19/154 |

OTHER PUBLICATIONS

Rondao Alface et al., "Interactive Omnidirectional Video Delivery: A Bandwidth-Effective Approach," Bell Labs Technical Journal 16, pp. 135-147 (Mar. 2012).

* cited by examiner

METHOD CONFIGURED TO BE IMPLEMENTED AT A TERMINAL ADAPTED TO RECEIVE AN IMMERSIVE VIDEO SPATIALLY TILED WITH A SET OF TILES, AND CORRESPONDING TERMINAL

This application is the U.S. National Stage, under 35 U.S.C. § 371, of International Application No. PCT/EP2019/066577 filed Jun. 24, 2019, which claims the benefit of European Application No. EP18305827.0 filed Jun. 28, 2018, the contents of which are incorporated herein by reference.

TECHNICAL FIELD

The present disclosure relates generally to the streaming of a tiles-based immersive videos (such as spherical videos, so called Virtual Reality (VR) 360° videos, or panoramic videos) to an end device through a delivery network.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Spherical videos offer an immersive experience wherein a user can look around using a VR head-mounted display (HMD) or can navigate freely within a scene on a flat display by controlling the viewport with a controlling apparatus (such as a mouse or a remote control).

Such a freedom in spatial navigation requires that the whole 360° scene is delivered to a player (embedded within the HMD or TV set) configured to extract the video portion to be visualized depending on the position of the observer's aiming point within the scene. In such a situation, a high throughput is necessary to deliver the video.

Therefore, one main issue relies on the efficient transmission of spherical videos over bandwidth constrained network with an acceptable quality of immersive experience (i.e. avoiding freeze screen, blockiness, black screen, etc.). Currently, for delivering a spherical video service in streaming, a compromise is being sought between immersive experience, resolution of video and available throughput of the content delivery network.

The majority of known solutions streaming spherical videos provides the full 360° scene to the end device, but only less than 10% of the whole scene is presented to the user. Since delivery networks have limited throughput, the video resolution is decreased to meet bandwidth constraints.

Other known solutions mitigate the degradation of the video quality by reducing the resolution of the portion of the 360° scene arranged outside of the current viewport of the end device. Nevertheless, when the viewport of the end device is moved upon user's action to a lower resolution area, the displayed video suffers from a sudden degradation.

Besides, when the targeted usage requires that the displayed video is always at the best quality, it prevents from using solutions based on a transitional degradation of resolution when the user's aiming point is varying. Consequently, the delivered video must cover a part of the scene large enough to allow the user to pan without risking a disastrous black area display due to a lack of video data. This part of the scene can for instance include the area which is currently viewed (i.e. the viewport or aiming point) and the surrounding region to prevent quality degradation when the user moves its viewport. This can be achieved by spatially tiling the scene of the immersive video with a set of tiles and temporally dividing the immersive video into a plurality of video segments defined by a plurality of tile segments, a tile covering a portion of a scene of the immersive video and a tile segment being associated with a tile of the set of tiles. One or more relevant tile segments of the immersive video (corresponding to tile(s) comprising the viewport and its surrounding) are delivered to a player.

However, while the user navigates within the scene, new tile(s) can be needed to display the viewport in order to react to eye's direction changes. The player will then request the corresponding tiles that match the current field of view.

The present disclosure has been devised with the foregoing in mind.

SUMMARY

According to one or more embodiments, there is provided a terminal configured to receive an immersive video spatially tiled with a set of tiles, a tile covering a portion of a scene of the immersive video, comprising at least one processor configured for:
  defining surfaces bounding tiles of the set of tiles;
  obtaining proportions of intersection for at least some of the surfaces intersected by a volume of vision;
  selecting one or more tiles according to the obtained proportions of intersection.

According to one or more embodiments, there is further provided a method configured to be implemented at a terminal adapted to receive an immersive video spatially tiled with a set of tiles, a tile covering a portion of a scene of the immersive video, comprising:
  defining surfaces bounding tiles of the set of tiles;
  obtaining proportions of intersection for at least some of the surfaces intersected by a volume of vision;
  selecting one or more tiles according to the obtained proportions of intersection.

According to one or more embodiments, there is provided a computer program product at least one of downloadable from a communication network and recorded on a non-transitory computer readable medium readable by at least one of computer and executable by a processor, comprising program code instructions for implementing a method configured to be implemented at a terminal adapted to receive an immersive video spatially tiled with a set of tiles, a tile covering a portion of a scene of the immersive video, said method comprising:
  defining surfaces bounding tiles of the set of tiles;
  obtaining proportions of intersection for at least some of the surfaces intersected by a volume of vision;
  selecting one or more tiles according to the obtained proportions of intersection.

According to one or more embodiments, there is provided a non-transitory program storage device, readable by a computer, tangibly embodying a program of instructions executable by the computer to perform a method configured to be implemented at a terminal adapted to receive an immersive video spatially tiled with a set of tiles, a tile covering a portion of a scene of the immersive video, said method comprising:

defining surfaces bounding tiles of the set of tiles;
obtaining proportions of intersection for at least some of the surfaces intersected by a volume of vision;
selecting one or more tiles according to the obtained proportions of intersection.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned method.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

Embodiments are depicted with regard to a streaming environment to deliver an immersive or large-field of view video (e.g. a spherical video, a panoramic video, etc.) to a client terminal through a delivery network.

Figure 1:
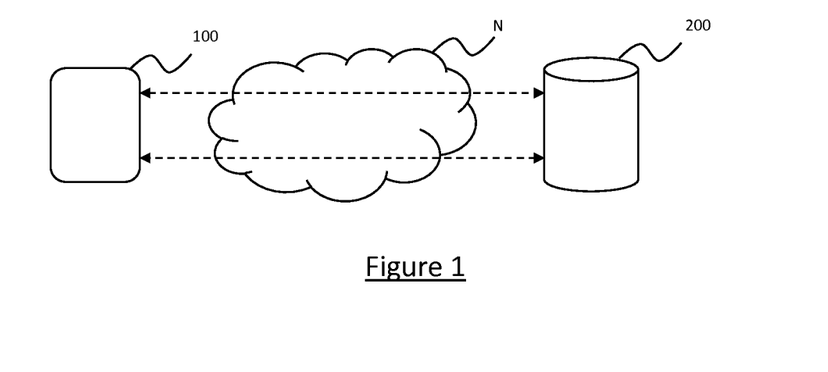
FIG. 1 is a schematic diagram of an exemplary Client-Server architecture wherein some embodiments might be implemented.

As shown in the exemplary embodiment of FIG. 1, a Client-Server network architecture, supported by a network N (e.g. the Internet, a home network, an enterprise network), comprises one or several client terminals 100 (only one client terminal is represented) and one or more network equipment 200 (only one is represented in FIG. 1), such as content servers (e.g. implementing the HTTP protocol to deliver data).

The client terminal 100 may wish to launch a streaming session for requesting a tile-based immersive video stored on the content server 200. The server 200 is then configured to stream segments of the tile-based immersive video to the client terminal 100, upon client's request, using a streaming protocol.

To that end, a list of tiles appearing partially or totally in a field of view of a user should be obtained in order to be requested by the client terminal 100 from the server 200.

Figure 2:
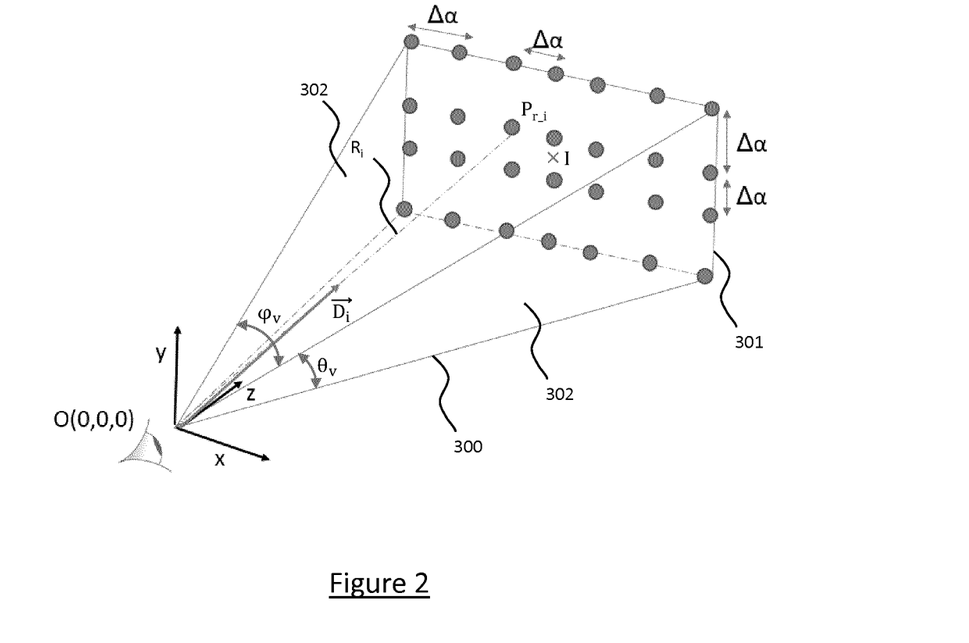
FIG. 2 shows an exemplary pyramid of vision according to some embodiments.

In one embodiment, as illustrated in FIG. 2, the field of view of a user can be modeled by a volume of vision such as a pyramid of horizontal angular amplitude $\varphi_v$ and vertical angular amplitude $\theta_v$, the top of the pyramid of vision 300 representing the user's eye. In an illustrative but non-limitative example, the pyramid of vision 300, formed by a plurality of rays $R_i$, is a pyramid with a rectangular base 301, wherein its lateral faces 302 are triangles. It should naturally be understood that other type and shape of the field of view might be considered without departing from the scope of the embodiments. In addition, the pyramid of vision can comprise at least the field of the user, in order to be able to request more unseen tiles (i.e. tiles not displayed on the screen) from the server in accordance with the available bandwidth.

To obtain the list of tiles to be requested by the client terminal, an intersection of the pyramid of vision 300 with tiles 600 covering the scene 400 is computed as described hereinafter.

Figure 3:
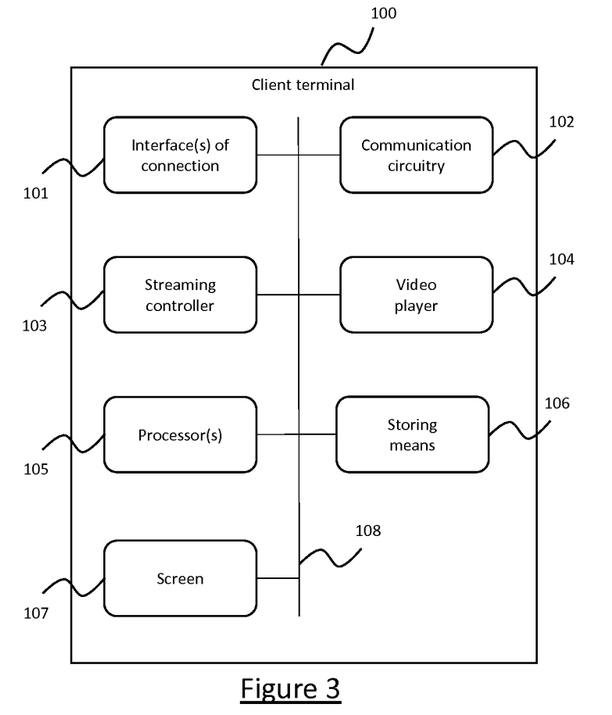
FIG. 3 is a schematic block diagram of an exemplary client terminal in accordance with an embodiment.

As shown in the example of FIG. 3, the client terminal 100 can comprise at least:
  one or more interfaces of connection 101 (wired and/or wireless, as for example Wi-Fi, Ethernet, etc.) to the network N or additional network (not shown in FIG. 1);
  a communication circuitry 102 containing the protocol stacks to communicate with the server 200. In particular, the communication module 102 comprises the TCP/IP stack well known in the art. Of course, it could be any other type of network and/or communicating means enabling the client terminal 100 to communicate with the server 200;
  a streaming controller 103 which receives the immersive video from the server 200 (and especially the corresponding segments);
  a video player 104 adapted to decode and render the encoded immersive video;
  one or more processor(s) 105 for executing the applications and programs stored in a non-volatile memory of the client terminal 100;
  storing means 106, such as a volatile memory, for instance for buffering the segments received from the server 200 before their transmission to the video player 104;
  a screen 107 adapted to display the received immersive video. In a variant, the screen is separate from the client terminal 100;
  an internal bus 108 to connect the various modules and all means well known to the skilled in the art for performing the generic client terminal functionalities.

As an example, the client terminal 100 is a portable media device, a mobile phone, a tablet or a laptop, a head mounted device, a TV set, a set-top box or the like. Naturally, the client terminal 100 might not comprise a complete video player, but only some sub-elements such as the ones for decoding the media content and might rely upon an external means to display the decoded content to the end user.

Figure 4:
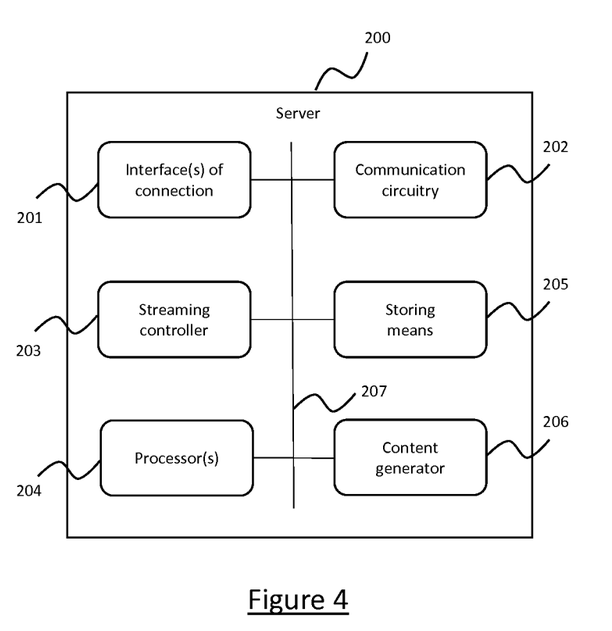
FIG. 4 is a schematic block diagram of an exemplary content server in accordance with an embodiment.

As shown in the embodiment of FIG. 4, the server 200 can comprise at least:
  one or more interfaces of connection 201 (wired and/or wireless) to the network N or additional network (not shown in FIG. 1);
  a communication circuitry 202 to deliver data to one or several requesting client terminals 100. In particular, the communication circuitry 202 can comprise the TCP/IP stack well known in the art. Of course, it could be any other type of network and/or communicating means enabling the server 200 to communicate with a client terminal 100;
  a streaming controller 203 configured to deliver the tile-based immersive video to one or several client terminals 100;
  one or more processor(s) 204 for executing the applications and programs stored in a non-volatile memory of the server 200;
  storing means 205;
  a content generator 206 configured to generate the immersive video to be transmitted. It should be understood that the content generator may be arranged in a separate apparatus distinct from the server 200. In such case, the apparatus comprising the content generator can send the immersive content to the server;
  an internal bus 207 to connect the various modules and all means well known to the skilled in the art for performing the generic server functionalities.

Tiling of the Immersive Video

Figure 5:
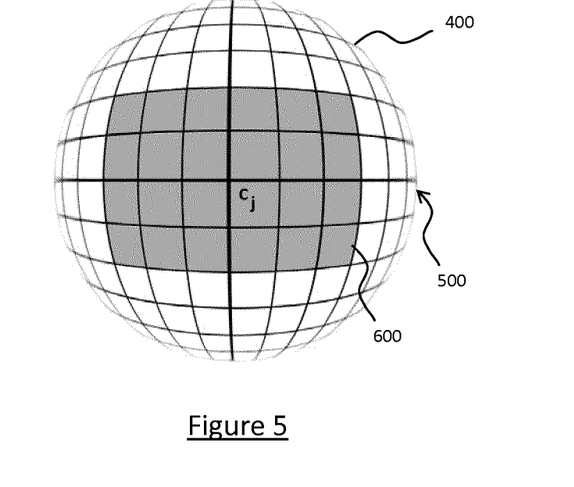
FIG. 5 depicts an exemplary tiling of a scene of a spherical video in accordance with an embodiment.

According to an exemplary embodiment shown in the FIG. 5, in a tile-based video service, the immersive video can be spatially sliced into a set of tiles 600 at the server side. The set of tiles covers the whole scene 400 of the immersive video. It is further assumed in the following that the scene 400 is projected on a sphere 500 as shown in FIG. 5. The center O of the sphere 500 (FIG. 6A) corresponds to the position of the acquisition device (not shown) which has acquired the immersive video and to the position of a user during the rendering of the immersive video.

According to an embodiment, the server 200 (e.g. via its processor(s) 204 and/or its content generator 206) is configured to operate a tiling of the spherical video with a set of tiles in an orthogonal system R(O,x,y,z) of axes x,y,z (illustrated in FIG. 6A) arranged at the center O of the sphere 500. In addition, in the example of video streaming, the tile-based immersive video is temporally divided into a plurality of video segments of, for instance, equal duration.

Figure 6A:
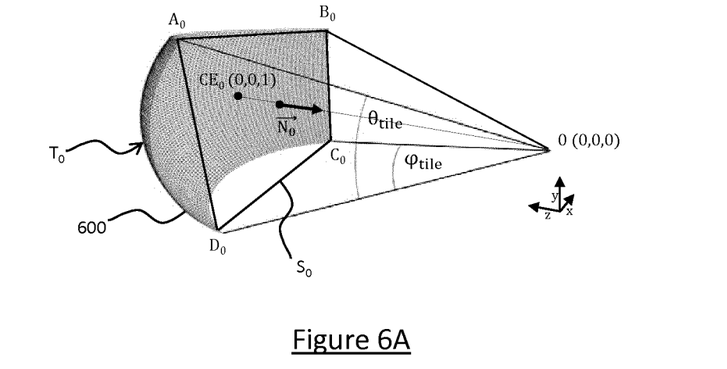
FIG. 6A shows an exemplary reference tile of a set of tiles covering the spherical video of FIG. 5, in accordance with an embodiment.
Figure 6B:
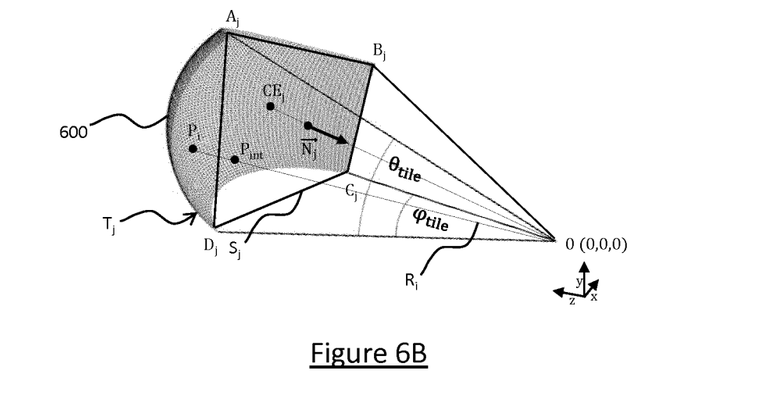
FIG. 6B shows an exemplary tile of the set of tiles obtained from the reference tile of FIG. 6A, in accordance with an embodiment.

As shown in the examples of FIGS. 5, 6A and 6B, each tile 600 of the set of tiles can be defined as a portion of the sphere 500 (i.e. arranged on the surface of the sphere and having a convex surface directed toward the center O of the sphere 500) covering a tile horizontal angular amplitude $\varphi_{tile}$ and a tile vertical angular amplitude $\theta_{tile}$. In another embodiment, instead of having only one size of tiles covering the scene, two or more distinct sizes of tiles might be used (e.g. a first size of tiles defined by angular amplitudes $\varphi_{tile\_0}$ and $\theta_{tile\_0}$ and a second size of tiles defined by angular amplitudes $\varphi_{tile\_1}$ and $\theta_{tile\_1}$) for tiling the scene.

Figure 7:
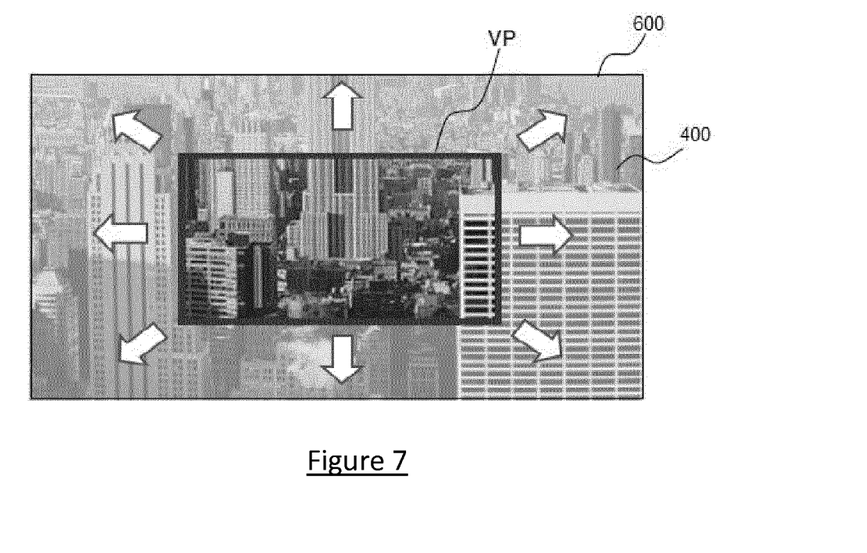
FIG. 7 shows an exemplary tile comprising a viewport according to an embodiment.

In an embodiment, the size of the tiles can be defined large enough to allow a variation of the focusing point without being forced to obtain and decode instantaneously another tile. In particular, in the following, it is assumed that one tile delivered to the terminal 100 can cover at least the part of the scene 400 to be displayed through a viewport VP associated with the client terminal 100 requesting the immersive video as shown in FIG. 7. Naturally, in other embodiments, when tiles are smaller than the viewport VP, several tiles might be needed to obtain the part of the scene displayed through the viewport VP.

While not necessary, it is further assumed that an overlap exists between consecutive tiles of the set of tiles. In addition, while a tile of rectangular shape has been illustrated in FIGS. 5 to 7, the present arrangements can naturally be applied to any other shape of tile.

Definition of Surfaces Bounding Tiles

Figure 8:
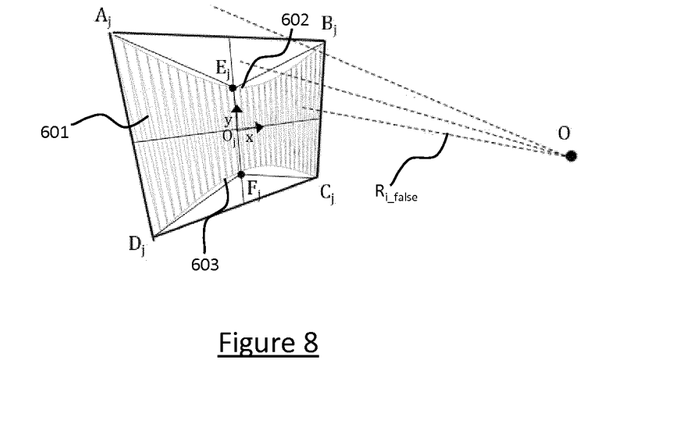
FIG. 8 shows a radial projection of a mesh of a tile on a surface in accordance with an embodiment.

As shown in FIG. 6B, the centroid $CE_j$ of a tile 600 corresponds to the center of a mesh (i.e. the set of vertices) associated with the tile. In the orthogonal system R(O,x,y,z), the polar coordinates of a centroid $CE_j$ are defined by $(\varphi_j, \theta_j)$, wherein j is an integer belonging to $[0, \ldots, T-1]$, T being the number of tiles 600 covering the sphere 500. In addition, as shown in FIG. 6B, a tile 600 is further defined by its four vertices $\{A_j, B_j, C_j, D_j\}$ forming a surface $S_j$ having a normal vector $\vec{N}_j$ oriented towards the center O of the sphere 500. In particular, a surface $S_j$ associated with a tile 600 comprises the radial projection 601 on a plane (to which vertices $\{A_j, B_j, C_j, D_j\}$ belong to) of the mesh of the considered tile, as illustrated in FIG. 8.

In particular, a reference tile $T_0$ is defined by a centroid $CE_0$ arranged on the z axis and having the polar coordinates (0,0,1). $\varphi_{tile}$ and $\theta_{tile}$ respectively define the maximum horizontal amplitude and the maximum vertical amplitude of the tile $T_0$. $(\varphi, \theta)$ define the polar coordinates of a point P belonging to the mesh associated with the tile $T_0$. In addition, the cartesian coordinates (x, y, z) of a point P of tile $T_0$ can be defined as follows:

$$\begin{cases} x = \sin(\varphi) * \cos(\theta) \\ y = \sin(\theta) \\ z = \cos(\varphi) * \cos(\theta) \end{cases}$$

with $\varphi \in [-\varphi_{tile}/2; +\varphi_{tile}/2]$ and $\theta \in [-\theta_{tile}/2; +\theta_{tile}/2]$ The minimum value $z_{min}$ of all points P of the mesh of tile $T_0$ on z axis corresponds to the minimum of $\cos(\varphi)*\cos(\theta)$, which is reached when $\varphi = \varphi_{tile}$ and $\theta = \theta_{tile}$, so that:

$$z\min = \cos(\varphi_{tile})*\cos(\theta_{tile})$$

As shown in FIG. 2, any ray $R_i$ of the pyramid of vision 300 issued from O and touching a mesh of a tile 600 at a point $P_i$ intersects, at a point $P_{int}$, the plane arranged at z=zmin and orthogonal to z axis. Point O (0,0,0), point $P_{int}$ ($x_{int}, y_{int}, z_{int}$) and point $P_i$ ($x_i, y_i, z_i$) are aligned (i.e. on a same axis), so that $OP_{int} = \lambda_i * OP_i$, wherein $\lambda_i$ is a constant hereinafter defined. The cartesian coordinates of $P_{int}$ is defined by:

$$\begin{cases} x_{int} = \lambda_i * x \\ y_{int} = \lambda_i * y \\ z_{int} = \lambda_i * z = z\min \end{cases}$$

wherein $\lambda_i = z\min/z$, $\lambda_i \in [z\min, 1]$.

The maximum value of coordinates ($x_{int}, y_{int}$) of a point $P_{int}$ (for any ray intersecting the mesh on a point $P_i$ ($x_i, y_i, z_i$)) is for instance given by:

$$\begin{cases} x_{int\_max} = \text{Max}(\sin(\varphi)*\cos(\theta)*\lambda_i) = \text{Max}(\tan(\varphi)*z\min) \\ y_{int\_max} = \text{Max}(\sin(\theta)*\lambda_i) = \text{Max}(\tan(\theta)/\cos\varphi*z\min) \end{cases}$$

so that, one can derive that the maximum cartesian coordinates of point $P_{int}$:

$$\begin{cases} x_{int\_max} = (\sin(\varphi_{tile}))*\cos(\theta_{tile}) \\ y_{int\_max} = \sin(\theta_{tile}) \\ z_{int} = z\min = \cos(\varphi_{tile})*\cos(\theta_{tile}) \end{cases}$$

From the foregoing, it can be derived that the vertices $\{A_0, B_0, C_0, D_0\}$ of the surface $S_0$ have the following cartesian coordinates:

$$\begin{cases} x_0 = +\sin(\varphi_{tile})*\cos(\theta_{tile}) \text{ or } -\sin(\varphi_{tile})*\cos(\theta_{tile}) \\ y_0 = +\sin(\theta_{tile}) \text{ or } -\sin(\theta_{tile}) \\ z_0 = \cos(\varphi_{tile})*\cos(\theta_{tile}) \end{cases}$$

Once the coordinates of the surface $S_0$ of the reference tile $T_0$ (FIG. 6A) are determined, the coordinates of the surface $S_j$ for any tile 600 obtained by applying a rotation R($\varphi_j, \theta_j, \psi_j$) to the reference tile $T_0$ can be derived by applying the same rotation R($\varphi_j, \theta_j, \psi_j$) to the reference surface $S_0$, i.e.:

$$=\{A_j, B_j, C_j, D_j\} = Rot(\varphi_j, \theta_j, \psi_j)*\{A_0, B_0, C_0, D_0\}$$

wherein Rot($\varphi_j, \theta_j, \psi_j$) is a matrix product which can be defined by:

$$Rot(\varphi_j, \theta_j, \psi_j) = Rot(z, \psi_j) \times Rot(x, \theta_j) \times Rot(y, \varphi_j)$$

Rot(x, $\theta_j$) is the rotation matrix associated with a rotation of an angle $\theta_j$ around an axis x of the orthogonal system R(O,x,y,z), Rot(y, $\varphi_j$) is the rotation matrix associated with a rotation of an angle $\varphi_j$ around the axis y of the orthogonal system R(O,x,y,z), Rot(z, $\psi_j$) is a rotation matrix associated with a rotation of an angle around the axis z of the orthogonal system R(O,x,y,z).

Sampling the Pyramid of Vision

Besides, the pyramid of vision 300 shown in FIG. 2 is initially arranged at a starting position corresponding to a null rotation of the user. In that starting position, the top of the pyramid of vision 300 corresponds to the origin O (0,0,0) of the orthogonal system R(O,x,y,z) and the center I of the base 301 of the pyramid of vision 300 belongs to the axis z of the system R(O,x,y,z).

In this position, a sampling of the rays $R_i$ defining the pyramid of vision 300 is performed to limit the number of rays $R_i$ to N rays. The intersection of the sampled rays $R_i$ with the base 301 of the pyramid defined N points $P_{R\_i}$ arranged such that they have a constant horizontal angular distance $\Delta\alpha$ and vertical angular distance $\Delta\alpha$ as illustrated in FIG. 2.

Then, for each point $P_{R\_i}$ of the base 301, a vector $\overrightarrow{OP_i}$ is defined and normalized to obtain a direction vector $\vec{D}_i$. A list of N unitary direction vectors $\vec{D}_i$ is then built.

The eye's direction in the starting position defined by a vector $\vec{D}$ coincides with z axis (0,0,1). A change of eye's direction can be defined by polar coordinates ($\varphi_c$, $\theta_c$), wherein $\varphi_c$ represents the horizontal angle between the eye's direction and the z axis, and $\theta_c$ corresponds to the vertical angle between the eye's direction and y axis. After eye's direction change (according to a rotation ($\varphi_c$, $\theta_c$) of the initial direction vector $\vec{D}$ of coordinate (0,0,1)), the new eye's direction vector $\vec{D'}$ can be obtained by implementing a rotation matrix Rot($\varphi_c$, $\theta_c$), so that:

$$\vec{D'} = Rot(\varphi_c, \theta_c) \times \vec{D}$$

wherein Rot($\varphi_c$, $\theta_c$) can be defined as a product of two rotation matrices around y axis and x axis, i.e. Rot($\varphi_c$, $\theta_c$)=Rot$_x$($\theta_c$)×Rot$_y$($\varphi_c$).

Thus, when the eye's direction changes, a new sampling values of direction vectors $\vec{D_i}$, (called $\vec{D'_i}$) with i belongs to [0, . . . , N−1] is implemented. The new coordinates of the N direction vectors $\vec{D'_i}$ can be obtained from the following equation:

$$\vec{D'_i} = Rot(\varphi_c, \theta_c) \times \vec{D_i}$$

Algorithm for Selection of Tiles

For each direction $\vec{D_i'}$ with i belonging to [0, . . . , N−1], the client terminal 100 can check (e.g. via its processor(s) 105) if the considered direction $\vec{D_i'}$ (associated with a ray R$_i$) intercepts one or more surfaces S$_j$ delimited by vertices {A$_j$,B$_j$,C$_j$,D$_j$} wherein j is an integer belonging to [0, . . . , M−1] (M corresponding to a number of candidate surfaces S$_j$ which have been preselected as defined hereinafter). The determination of the interception of a direction $\vec{D_i'}$ with a surface S$_j$ corresponds to solve the equation of the intersection of a vector with a plane, which can be achieved by using mathematic libraries. The number of equations to solve is then N×M.

To that end, a list of candidate tiles containing the M candidate surfaces S$_j$ is established and a list of counters per tile is initially set to zero. Each time a direction $\vec{D_i'}$ hits a candidate surface Si amongst the M surfaces, the counter associated with the corresponding tile is incremented.

The intersection of the N vectors $\vec{D_i'}$ (the N rays R$_i$) with all the M surfaces S$_j$ of the candidate list is determined. Then, the proportion of intersection of the pyramid of vision 300 with a surface S$_j$ of the M preselected surfaces S$_j$ is obtained from the corresponding counter (i.e. higher the value of a counter, higher the proportion of intersection).

To select (or pre-filter) M candidate tiles amongst the T tiles of the set of tiles covering the scene 400 (by assuming that the current eye's direction $\vec{D}$ in polar coordinate is ($\varphi$, $\theta$)), one embodiment consists in considering only tiles whose centroids altitudes are close to $\theta$ and/or whose centroids horizontal amplitude is close to $\varphi$.

It should be understood that the intersection of the pyramid of vision 300 with the M candidate tiles is determined each time a change of eye's direction is detected.

In particular, to determine one intersection of one ray R$_i$ (associated with a vector $\vec{D_i'}$) of the pyramid 300 with one surface S$_j$, the following operations can be implemented:

check if the direction $\vec{D_i'}$ hits the plane formed by the surface S$_j$ {A$_j$,B$_j$,C$_j$,D$_j$}. This is for instance the case when the scalar product $\vec{D_i'} \cdot \vec{N_j}$ is different from zero; obtain the coordinates of the intersection P$_{int}$ on this plane;

verify whether P$_{int}$ belongs to the surface S$_j$ {A$_j$,B$_j$,C$_j$,D$_j$}. One method can rely on showing that P$_{int}$ is always arranged on the right side of segments [A$_j$B$_j$], [B$_j$C$_j$], [C$_j$D$_j$], [D$_j$A$_j$]. To that end, the four cross products $\vec{V_1}$=$\vec{A_jB_j} \times \vec{A_jP_{int}}$, $\vec{V_2}$=$\vec{B_jC_j} \times \vec{C_jP_{int}}$, $\vec{V_3}$=$\vec{C_jD_j} \times \vec{C_jP_{int}}$, $\vec{V_4}$=$\vec{D_jA_j} \times \vec{D_jP_{int}}$ can be determined in order to check that these four cross-products vectors have the same direction than $\vec{N_j}$ (their scalar product $\vec{V_1}.\vec{N_j}$, $\vec{V_2}.\vec{N_j}$, $\vec{V_3}.\vec{N_j}$, $\vec{V_4}.\vec{N_j}$ should be positive). When the four cross-product vectors have the same direction, P$_{int}$ belongs to the surface S$_j$.

It should be understood that the determination of the rays intersecting a surface S$_j$ relies on one approximation. As shown in FIG. 8, some rays R$_i$ of the pyramid of vision 300 intersecting the surface S$_j$ associated with a tile T$_j$ do not hit the mesh of said tile (referenced by R$_{i\_false}$ on FIG. 8 and so called false positive rays). The radial projection of points of the mesh of a tile on the associated surface S$_j$ corresponds to a shape notably defined by two hyperbolic curves 602. The space delimited by the segment [A$_j$B$_j$] and the hyperbolic curve 602 or the segment [D$_j$C$_j$] and the hyperbolic curve 603 decreases when the values $_{tile}$ and $\theta_{tile}$ of the tile decrease, leading to reduce the proportion of false positive rays. In other words, the proportion of rays intersecting a surface S$_j$ without hitting the corresponding mesh of the considered tile (i.e. false positive rays) depends on the value of $\theta_{tile}$ and becomes meaningless for small values of $\theta_{tile}$ (i.e. for small tiles).

It should further be noted that instead of considering a surface S$_j$ having a rectangular shape, in another embodiment, a surface S$_j$ having a trapezoidal shape (e.g. formed by two or more contiguous trapezia) is used. In particular, as shown in the example of FIG. 8, the surface S$_j$ is defined by points {A$_j$,E$_j$,B$_j$,C$_j$,F$_j$,D$_j$}, wherein the points E$_j$ and F$_j$ can correspond to the images of a point (x, 0) arranged on the axis x of an orthogonal system R'(O$_j$x,O$_j$y) (O$_j$ being the center of the considered surface S$_j$) obtained by applying respectively the functions defining the hyperbolic curves 602 and 603 (for instance, x∈[−x$_{Bi}$, +x$_{Bi}$] with x$_{Bi}$ the x coordinate of point B$_j$ in the system R'(O$_j$x,O$_j$y)).

Algorithm for Asking Tiles to the Server

Once the intersections have been determined for the selected M tiles, an intersection list of tiles comprising the tiles j among the M selected tiles for which the number of hitting rays is positive (i.e. the corresponding counter is different from 0) is established. In the intersection list, the tiles T$_j$ are listed by decreasing order of their counter value.

In one embodiment, the client terminal can request all the tiles of the intersection list. In another embodiment, the number of tiles which can be requested to the server can take into account the traffic size Size$_j$ (i.e. corresponding to the bandwidth requirement to transmit a tile segment associated with a considered tile between server and client, and wherein Size$_j$ can depend on the size of the tiles) and the maximum available bandwidth on the network N. In that case, the tiles are selected by considering the intersection list (tiles are considered by decreasing order) and their traffic size Sim$_j$, so that the sum of Size$_j$ of the selected tiles is less than maximum available bandwidth on the network. In a further variant, when tiles have a same counter value (e.g. a same number of rays hits the tiles), the selection of tiles can depend on the distance between the center I of the base 301 of the pyramid of vision 300 and the centroids $CE_j$ of the tiles $T_j$ the selection being performed by considering first the tile with the smallest distance.

Figure 9:
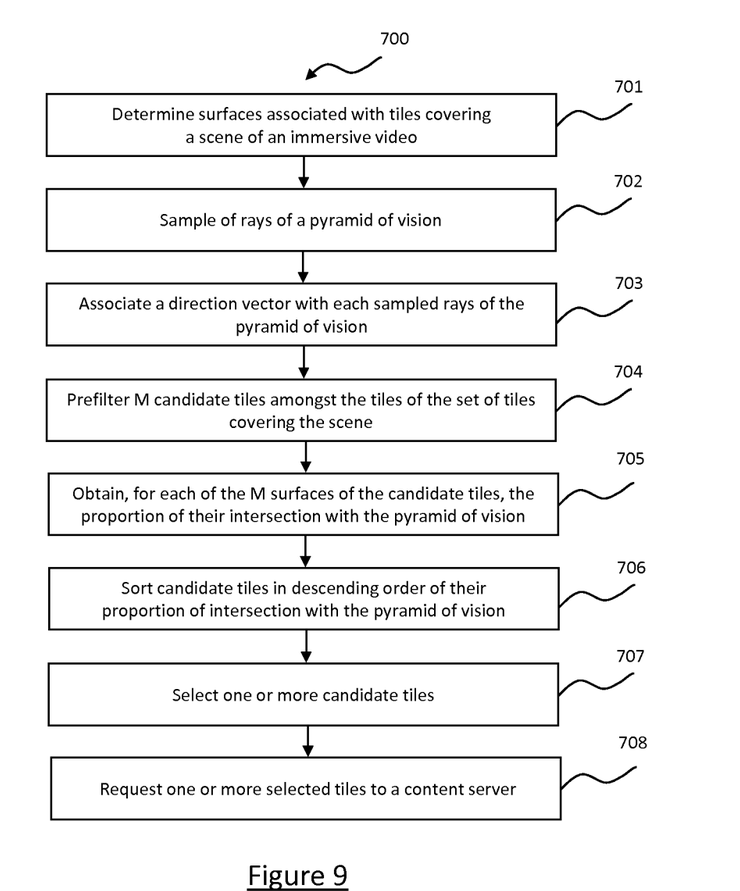
FIG. 9 is a flow chart of an exemplary method for selecting tiles during a streaming session of an immersive video, used by some embodiments.

As shown in FIG. 9, in one embodiment, the client terminal 100 can be configured to implement (e.g. via its processor(s) 105) a method 700 for selecting tiles during a streaming session of an immersive video.

In particular, in a step 701, the client terminal 100 can determine a surface $S_0$ of a reference tile T0 and then the surfaces of the remaining tiles 600 by applying a rotation matrix to the reference surface $S_0$.

In a step 702, the client terminal 100 can perform a sampling of the rays forming the pyramid of vision 300 by selecting rays $R_i$ ($i \in [0, \ldots, N-1]$) so that the intersections of the sampled rays $R_i$ with the base 301 of the pyramid 300 define N points $P_{R\_i}$ presenting a constant angular distance $\Delta \alpha$ horizontally and vertically with each other.

In a step 703, the client terminal 100 can associate a direction vector $\vec{D_i}$ to each sampled ray $R_i$. When a change of user's eyes direction is detected (i.e. the orientation of the pyramid of vision is modified), new N direction vectors $\vec{D_i}'$ associated with the corresponding sampled rays $R_i$, of the newly oriented pyramid of vision 300 are obtained.

In a step 704, the client terminal 100 can operate a prefiltering of M tiles amongst the T tiles of the set of tiles.

In a step 705, the client terminal 100 can determine, for each of the M surfaces $S_j$ of the candidate tiles $T_j$, the proportion of their intersection with the pyramid of vision 300 (i.e. for each prefiltered tile $T_j$, the number of rays $R_i$ hitting the corresponding surface $S_j$).

In a step 706, the client terminal 100 can sort the prefiltered tiles $T_j$ in descending order of their proportion of intersection with pyramid of vision 300 (i.e. the tile having the most important intersection with the pyramid of vision first).

In a step 707, the client terminal 100 can select one or more prefiltered tiles $T_j$, so as to comply with a bandwidth criterium (e.g. the sum of the traffic sizes associated with the selected prefiltered tiles is less or equal to the maximum of the available bandwidth of the network N).

In a step 708, the client terminal 100 can request the one or more selected tiles to the content server 200.

It should be understood that, when a change of user's eyes direction is detected, steps 703 to 708 can be repeated.

At least some of the described embodiments make the selection of tiles much more robust and accurate, notably by triggering downloading of tiles sooner than other approaches, as soon as an "edge" of a tile appears in the field of view. It allows also to download in priority tiles contributing more to the field of view (i.e. tiles having a higher zone of intersection with the pyramid of vision). It should also be noted that some computations are massively parallelizable on GPU, making it efficient and fast. Indeed, some of the described embodiments can be implemented in hardware or software, using CPU or a GPU. As N×M equations—totally independent with each other—are computing, it should be appreciated that the selection step can be fully parallelizable, for instance on a GPU (e.g. each equation can then be solved by a single GPU thread).

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A terminal configured to receive an immersive video spatially tiled with a set of tiles, a tile covering a portion of a scene of the immersive video, comprising at least one processor configured to:
   define surfaces bounding tiles of the set of tiles;
   obtain proportions of intersection for at least one or more of the surfaces intersected by a number of rays of a volume of vision hitting the surfaces, wherein the rays of the volume of vision are based on a 3-dimensional coordinate system; and
   select one or more tiles according to the obtained proportions of intersection;
   wherein the definition of the surfaces bounding tiles are determined from information received from a content server.

2. The terminal of claim 1, wherein the at least one processor is further configured to:
   receive a description of available tiles from a content server; and define the surfaces bounding tiles based on the received description.

3. The terminal of claim 1, wherein a surface bounding a tile comprises a radial projection of a mesh of the tile on a plane to which vertices of the tile belong.

4. The terminal of claim 1, wherein the at least one processor is further configured to:
  determine a set of sampling rays for the volume of vision, such that the sampling rays have a constant angular distance horizontally and vertically with each other.

5. The terminal of claim 1, wherein the at least one processor is further configured to:
  select candidate tiles amongst the set of tiles so that the proportions of intersection are obtained only for the candidate tiles.

6. The terminal of claim 1, wherein the selection of one or more tiles complies with a bandwidth criterion.

7. The terminal of claim 6, wherein the bandwidth criterion is met when a sum of the traffic sizes associated with the selected tiles is less than or equal to a bandwidth available on a network to which the terminal belongs.

8. The terminal of claim 1, wherein the tiles are different sizes or non-rectangular.

9. The terminal of claim 1, wherein the terminal further comprises a screen to display the immersive video.

10. A method performed by a terminal adapted to receive an immersive video spatially tiled with a set of tiles, a tile covering a portion of a scene of the immersive video, comprising:
  defining surfaces bounding tiles of the set of tiles;
  obtaining proportions of intersection for at least some of the surfaces intersected by a number of rays of a volume of vision hitting the surfaces, wherein the rays of the volume of vision are based on a 3-dimensional coordinate system; and
  selecting one or more tiles according to the obtained proportions of intersection;
  wherein the defining of the surfaces bounding tiles is determined from information received from a content server.

11. The method of claim 10, further comprising:
  receiving a description of available tiles from a content server; and
  defining the surfaces based on the received description.

12. The method of claim 10, wherein a surface bounding a tile comprises a radial projection of a mesh of the tile on a plane to which vertices of the tile belong.

13. The method of claim 10, further comprising:
  determining a set of sampling rays for the volume of vision, such that the sampling rays have a constant horizontal angular distance and vertical angular distance with each other.

14. The method of claim 10, further comprising:
  selecting candidate tiles amongst the set of tiles so that the proportions of intersection are obtained only for the candidate tiles.

15. The method of claim 10, wherein the selecting of one or more tiles complies with a bandwidth criterion.

16. The method of claim 15, wherein the bandwidth criterion is met when a sum of the traffic sizes associated with the selected tiles is less than or equal to a bandwidth available on a network to which the terminal belongs.

17. The method of claim 10, wherein the tiles are different sizes or non-rectangular.

18. The method of claim 10, wherein the terminal is adapted to display the immersive video.

* * * * *